United States Patent [19]

Müller et al.

[11] 4,298,448

[45] Nov. 3, 1981

[54] ELECTROPHORETIC DISPLAY

[75] Inventors: Klaus Müller, Baden; Andreas Zimmermann, Emmenbrücke, both of Switzerland

[73] Assignee: BBC Brown, Boveri & Company, Limited, Baden, Switzerland

[21] Appl. No.: 115,016

[22] Filed: Jan. 24, 1980

[30] Foreign Application Priority Data

Feb. 2, 1979 [CH] Switzerland ..................... 1034/79

[51] Int. Cl.³ .......................... C25D 1/12; B03C 5/00
[52] U.S. Cl. ........................... 204/299 R; 204/180 R; 350/355; 350/362; 355/3 P; 430/31
[58] Field of Search ................................ 350/362, 355; 204/299 R, 180 R; 96/1 A; 357/73; 355/3

[56] References Cited

U.S. PATENT DOCUMENTS

| | | | |
|---|---|---|---|
| 3,372,102 | 3/1968 | Lennon | 204/180 R |
| 3,684,683 | 8/1972 | Ota | 204/180 R X |
| 3,812,406 | 5/1974 | Henri | 357/73 |
| 3,914,040 | 10/1975 | McVeigh | 355/3 |
| 4,093,534 | 6/1978 | Carter et al. | 204/180 R X |
| 4,126,528 | 11/1978 | Chiang | 204/180 R |

FOREIGN PATENT DOCUMENTS 1193276  5/1970  United Kingdom .

Primary Examiner—Arthur C. Prescott
Attorney, Agent, or Firm—Oblon, Fisher, Spivak, McClelland & Maier

[57] ABSTRACT

An electrophoretic display including a cell having two plates spaced apart and provided at least regionally with electrodes, where at least one plate and an associated electrode facing the observer are transparent. The cell contains a suspension consisting of an inert dielectric liquid phase and a dispersed solid phase which at least in part are optically discriminable electrophoretic particles. The individual electrophoretic particles each are of practically the same density as the liquid phase, and at least part of the electrophoretic particles are pigment particles provided with a coating of organic material which is solid at the cell operating temperature but which melts at higher temperatures. The coating material contains at least one charge control agent. The charge control agent, preferably a salt of a divalent metal or metal of higher valency and of an organic acid, imparts a well-defined, uniform surface charge and a well defined, uniform surface potential to the particles.

18 Claims, 1 Drawing Figure

ELECTROPHORETIC DISPLAY

This invention relates to electrophoretic displays and to a process of fabricating such displays.

DESCRIPTION OF THE PRIOR ART

Electrophoretic displays, also called electrophoretic image displays and abbreviated in the following as EPID or EPID cells, are a known kind of passive electrooptic display suitable for the display of digital or alphanumeric or analog information. Such EPID cells and their fabrication have been described, e.g., in U.S. Pat. No. 3,668,106 and in Proceedings of the IEEE, July 1973, pp. 832–836, by I. Ota et al.

The cells of such displays have two plates which are usually parallel and which are at least regionally covered with electrode layers. The front plate, i.e., the plate facing the observer, and the electrode layer applied to it are transparent, and the plates are separated so as to form a closed cell space between them.

Direct current signals can be used to produce a locally defined electric field between overlapping electrode segments on the two plates when they are selectively addressed in the same manner known for the addressing of other electrooptic displays.

Enclosed between the plates or electrodes is a generally inert dielectric liquid phase consisting, e.g., of a halogenated hydrocarbon, which has a finely divided solid phase dispersed in it. The particles of this solid phase are electrophoretically active, i.e. they migrate to the positive or negative electrode under the influence of an applied field, and hence will be called electrophoretic particles.

The electrophoretic particles are made optically different from the dielectric liquid phase, e.g. through the use of contrasting dyes and/or a veiling action. For this reason, the electric fields or regions of these fields can become visible, either as a color contrast or as a contrast between light and dark. This effect will be referred to herein as "optical discriminability" of the electrophoretic particles. It is unimportant whether either the particles or the liquid phase, or both, are colored or dyed, or whether they exhibit differences in absorption with respect to light (including UV). In practice, the liquid dielectric can be tinted for these purposes, e.g. by dissolving a dye in it, and/or the electrophoretic particles can be pigment particles which yield a contrasting color or contrasting absorption relative to the dielectric when they accumulate selectively at certain electrodes under the action of the electric field.

It is of practical importance that the suspension of electrophoretic particles be stable in the absence of electric fields, i.e. that the particles will neither sediment nor rise in the liquid, but have practically the same density as the liquid dielectric. Typical inorganic pigments such as $TiO_2$ (density about 4 g/cm$^3$) have a much higher density than liquid halogenated hydrocarbons such as $CCl_4$ (density 1.59 g/cm$^3$) or similar dielectric liquids. A means known to compensate this density difference is the encapsulation or embedding of the electrophoretic particles with synthetic materials (of a density of $\leq 1$ g/cm$^3$), e.g., with phenolformaldehyde resin or both polyethylene.

Known embedding materials and the methods used to encapsulate electrophoretic particles with these materials, however, give rise to significant technical and time requirements, e.g., they require ball milling for several days, and the uniformity of the encapsulating coatings often is unsatisfactory.

The present applicant has suggested a method of surmounting these difficulties (Swiss Patent Application No. 1034-79 of Feb. 2, 1979) which uses wax materials, e.g., paraffinic waxes or low-molecular-weight polyalkenes, instead of synthetic resins in the encapsulation of inorganic pigments.

The preferred properties of pigments such as $TiO_2$ are not altered by the encapsulation, but the surface properties of the encapsulated pigment particles are governed by the encapsulating material used. The pigment particles must possess a well-defined uniform surface charge, or a similarly well-defined, uniform surface potential in order to be suitable in the operation of electrophoretic displays, i.e. in order to be driven to selected electrodes inside the display cell by an externally applied electric field.

It is known in the art that the charge of pigment particles can be defined by certain charge control agents; e.g. according to Applied Spectroscopy, No. 2, pp. 107 to 111 (1979), the pigment particles are charged up in a defined way by proton transfer from a polyamine added to the suspending liquid. However, this possibility of a controlled chemical interaction between charge control agents and the pigment surface is lost when this surface is covered up with an encapsulating material.

It is further known from the aforementioned U.S. Pat. No. 3,668,106 that substances such as cobalt naphthenate, manganese naphthenate, or nickel naphthenate are dissolved to impart color to the dielectric liquid, and such salts are effective as charge control agents.

The addition of charge control agents to the dielectric liquid in EPID cells is a measure of very limited effect, and usually has the additional disadvantage of raising the electric conductivity of the dielectric liquid.

SUMMARY OF THE INVENTION

Accordingly, it is an object of this invention to produce an electrophoretic display where the encapsulated electrophoretic particles have a clearly defined, uniform surface charge or surface potential.

It has been found that this can be achieved in a surprisingly simple and effective way by charge control agents of which at least one is contained in the coating of the electrophoretic particles, i.e. in the material in which the pigment particles are embedded.

This is a particularly easy to accomplish with the wax materials preferred according to this invention for the encapsulation, since many charge control agents, and in particular those which are preferred, are readily soluble in the waxes and can simply be incorporated in them during the encapsulation step.

According to the present invention, therefore, not only inorganic but also organic pigments can be profitably encapsulated when they are to be used as electrophoretic particles, even though, as in the case of organic pigments, it would still be possible to equalize the densities of the electrophoretic particles and of the liquid dielectric medium without encapsulation.

Methods to embed or encapsulate more or less finely divided solids with wax in order to make these solids oleophilic are known, e.g. from U.S. Pat. No. 3,161,602. It is the essential idea of the method described in this patent that a fusible wax melts in an organic liquid and that a three-phase system of molten wax, organic liquid, and solid particles is formed. This method is less preferred for the purposes of the present invention.

It is more advantageous for the purposes of producing a suspension for EPID cells according to the present invention to use a nonpolar, aprotic solvent such as liquid halogenated hydrocarbons, liquid or paraffinic hydrocarbons as the working medium, together with an embedding material selected from solids which are poorly soluble or insoluble in the working medium at ordinary temperature, but which melt below the boiling point of the working medium and dissolve completely (in any mixing ratio, e.g. up to about 100 wt.%) or to a considerable extent (e.g. in an amount of 10 to 50 wt.%) in the working medium when a relatively sharply defined threshold temperature is exceeded, and which reprecipitate upon subsequent cooling when the threshold temperature is passed in the opposite direction.

This effect of a discrete solubility/temperature curve is briefly designated here as "thermosolution effect", since the term "solvation" implies the use of additives and hence is not an effect that is primarily temperature-controlled.

The waxes preferentially used as embedding material are, in particular, paraffinic waxes and polyalkene waxes with melting points in the range of 50° to 150° C. The molecular weight of such materials usually is in the range of 2,000 to about 10,000. Technical paraffins, in particular those of the microcrystalline kind, as well as low-molecular-weight polyethylenes and polypropylenes are mentioned as examples, and can be obtained commercially as "polyolefinic waxes". Other waxes including materials of natural origin can be used as well.

Preferred charge control agents are organic salts (including complex salts) of divalent metals and metals of higher valency, in particular from groups IIA and IIIA as well as the group of iron metals, i.e. in particular Mg, Ca, Al, Fe, Co, Ni, and further Cu(II) and Zn; suitable organic constituents of the salts are those radicals of organic compounds which possess protonic or protonizable hydrogen atoms. These include, in addition to the carboxylic acids, the sulfonic and analogous acids, as well as alcohols, phenols, etc.

The charge control agent preferably is soluble at least in part in the form of a solid solution in the embedding material, in particular the wax. This is the case, in particular, with the aforesaid metal salts with organic acids, in particular with carboxylic acids which contain at least 5 C-atoms and preferably are monobasic acids which contain at least 8 and preferably 12 C-atoms. Alkanoic acids, in particular the higher saturated fatty acids such as stearic acid and the corresponding alkenoic acids such as oleic acid, can be mentioned as examples. Other carboxylic acids, e.g. aromatic and alicyclic carboxylic acids such as naphthenic acids, are also suitable.

In the process of making an electrophoretic display according to the present invention, the coating around the pigment particles is formed in the presence of said charge control agents. Suitable pigments are inorganic materials such as $TiO_2$, $ZrO_2$, ZnO, $Al_2O_3$, $BaSO_4$, CdS, ZnS, and $CaCO_3$, or organic substances such as Hansa Yellow, Heliogen Blue, and the like, which usually can be obtained commercially.

The average particle size of the embedded electrophoretic particles is typically about one tenth of the distance between the electrodes, which for example is between 50 and 200 $\mu$m. A pigment particle size in the range from 0.05 $\mu$m to 10 $\mu$m can be cited as an example when the embedded pigment particles are to have an average diameter in the typical range between 0.1 and 20 $\mu$m.

In the process of making the electrophoretic particles one can work in an aprotic, nonpolar solvent or mixture of solvents (the working medium) which then can be used as the liquid phase of the suspension in the EPID cell as well. The liquid phase of EPID cells preferably is of a relatively low viscosity, while the working medium can have a relatively higher viscosity and, usually, in this case, an appropriately higher boiling point or boiling range (e.g., 70° to 150° C.). Usually it is not particularly preferable to use the working medium also as the liquid phase of the EPID cell suspension, since it is advantageous to wash the electrophoretic particles which have been embedded and contain charge control agent in their coating with a preferably volatile organic liquid which, at room temperature, does not dissolve the coating material.

In a preferred process, a nonionic surfactant soluble in the working medium is added to the working medium serving to embed the pigment particles, in addition to the encapsulating material and the charge control agent. Examples of such surfactants are the esters of polyhydric alcohols and monocarboxylic acids containing at least 8 C-atoms, e.g. sorbitan monooleate, dioleate, or trioleate or the corresponding stearates, as well as condensation products of alcohols or phenols and alkylene oxides, e.g. of isononylphenol and ethylene oxide. By surfactant addition one can control the size of the encapsulated electrophoretic particles, to produce particles of uniform size.

Preferably the electrophoretic particles are produced in such a way that the pigment particles and the wax are suspended together at a temperature below the thermosolution temperature of the wax in the practically nonpolar aprotic liquid in which the wax is thermosoluble, and are jointly heated with agitation to a temperature which is above the thermosolution temperature of the wax in the liquid; the mixture thus formed then is cooled to a temperature which is below the thermosolution temperature.

The thermosolution temperatures of a particular wax in particular working media can be readily determined with a few simple experiments involving the measurement of the clearing or clouding temperature. Generally this temperature is between 30° and 150° C., and preferably between 50° and 100° C.

The thickness of the encapsulating coating can be controlled with the concentration of the encapsulating material in the working medium, or with the ratio between this concentration and the pigment concentration, and also with a variation of the temperature/time relation.

Pigments in the particle sizes mentioned above can for example be processed to electrophoretic particles, also in the range of particle sizes mentioned above, when a mixture of 10 to 90 wt.% of pigment particles and 90 to 10 wt.% of encapsulating wax are used, and this mixture is introduced into an amount of working medium, e.g. liquid paraffin, which is at least three times greater in weight than said mixture.

The amount of charge control agent which is jointly introduced into the working medium is suitably controlled so that 50 to 100 elementary charges are produced on the surface of a particle of 1 $\mu$m in radius. This will produce sufficient electrophoretic mobility, on the order of $10^{-4}$ to $10^{-5}$ cm$^2$sec$^{-1}$V$^{-1}$. The coating of the electrophoretic particles typically contains at least about 0.01 to about 10 wt. %, preferably about 1 wt. % of the charge control agent. This usually corresponds to a concentration in the working medium which is about 0.02 to 20% of the weight of encapsulating material.

The surfactant is added to the working medium mainly to control the thickness and uniformity of the coating, and it is added in proportions approximately corresponding to those of the charge control agent. The surfactant also serves to keep the electrophoretic particles still having liquid coatings from sticking together. A final electrophoretic particle generally can contain more than a single pigment nucleus.

Vigorous agitation usually prevails throughout the encapsulating procedure. The encapsulated pigment particles, after preferably being separated from the working medium and washed, but usually without a special drying step, are dispersed in the dielectric liquid which is to be used in the EPID cell. The dielectric liquid is, for example, a mixture of a fluorocarbon such as "FREON" 113 and liquid paraffin, and the dispersion is effected with brief sonication. The suspension can then be filled into and sealed in the cell in a manner known in the art.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
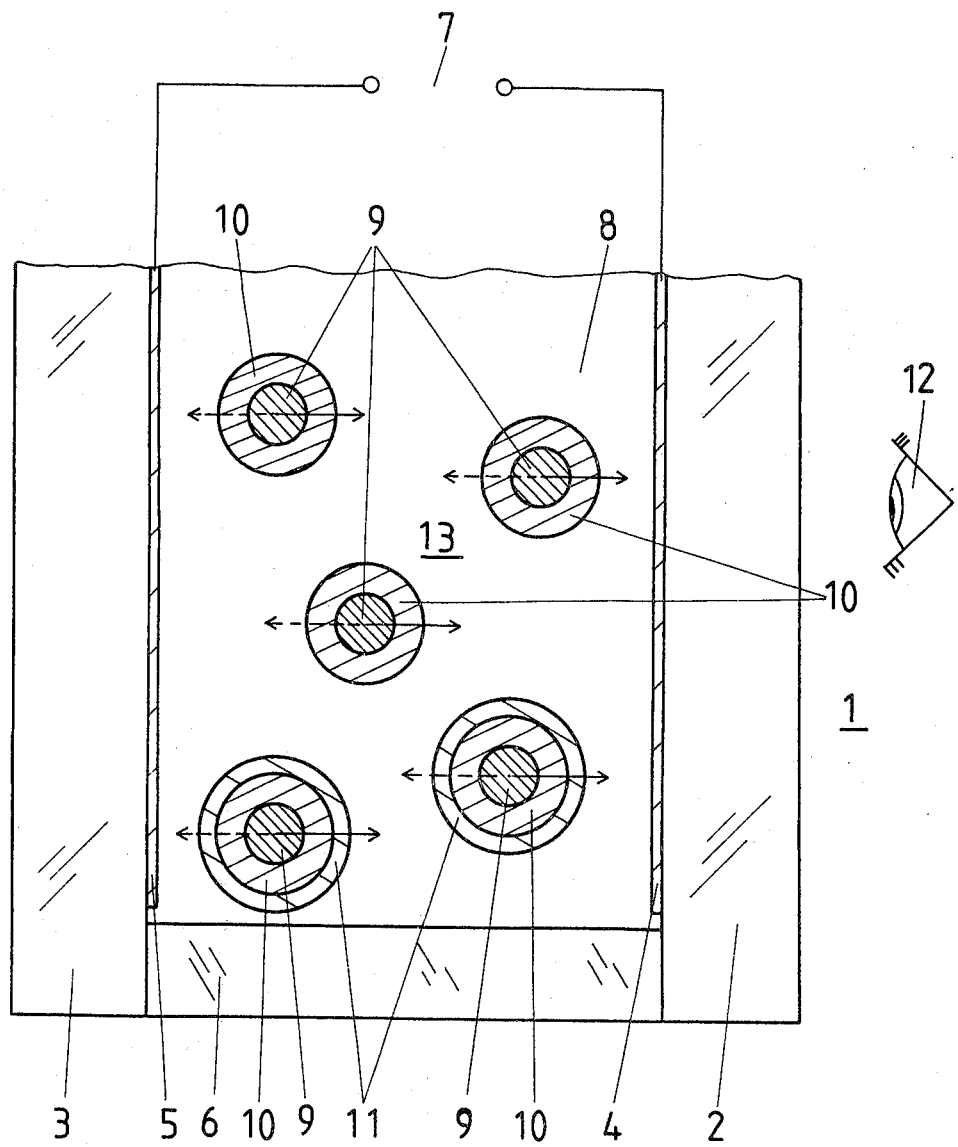
FIG. 1 is a schematic cross-sectional view of an electrophoretic display.

Referring now to the drawing, the cell 1 shown in FIG. 1 represents a nonemissive, reflective display. The operating principle is transport of the electrophoretic particles 9, 10 in the inert dielectric liquid 8 in the direction shown by arrows in FIG. 1. The suspension 13 is formed of the electrophoretic particles 9, 10, and the, usually dyed, dielectric liquid 8 is enclosed in the space formed by the two plates 2, 3 and the fritted glass seal 6 along the edges of the plates. Plates 2, 3, of which at least the front plate 2 facing the observer is transparent, are provided with electrodes 4, 5 applied to the inner faces, and of these electrodes, at least the one in front, 4, is transparent. By application of a suitably poled electric potential difference to electrodes 4, 5 by means of voltage source 7, the particles 9, 10 are deposited at the transparent front electrode 4, and the color of the particles 9, 10 becomes visible. But when particles 9, 10 are transported to the rear electrode 5 by application of an oppositely poled potential difference (and thus of an oppositely directed field between electrodes 4, 5), only the color of the inert dielectric liquid 8 remains visible. As indicated previously, it is important for the satisfactory operation of the EPID cell 1 that the particles 9, 10 are truly suspended in the liquid 8, i.e. that they do not exhibit a preferred sense of motion relative to the direction of gravity. This presupposes that particles 9, 10 have the same density, i.e. the same specific gravity as the liquid 8. To this end the pigment particles 9 have been provided with encapsulating coatings 10 or 10, 11. It is important here that all pigment particles 9, regardless of whether they are of a uniform size or not, are provided with encapsulating coating 10 or 10, 11 which meet the condition that the resultant specific gravity for all encapsulated particles 9, 10 or 9, 10, 11, which is governed by the pigment-coating mass ratio, has essentially the same value. Then the operating characteristics of the EPID cell are independent of display orientation in gravitational fields.

Apart from the process of making the suspension 13, cell 1 of FIG. 1 can be fabricated in a manner known in the art. This is true as well for the electric addressing of the display. The following examples illustrate the process of making suspensions 13.

EXAMPLE 1

(A) The working medium used to make electrophoretic particles according to the present invention was a commerical aliphatic solvent consisting of hydrocarbons of isoparaffinic structure available from catalytic synthesis which is practically free of polar and reactive components and has a concentration of aromatic hydrocarbons of less than 1 wt. %. The solvent has a boiling range (determined according to ASTM D86) from 116° to 142° C. (50 vol. % at 121° C.), a density (according to ASTM D287, at 15° C.) of 0.72 g/cm$^3$, and a refractive index at 20° C. (according to ASTM D1218) of 1.4041. Such solvents are available commercially, e.g. as the "ISOPAR" brand products of the ESSO company. The solvent used in the present example was "ISOPAR" type E.

(B) In 100 ml of this solvent, the following were suspended at room temperature (20° to 25° C.) with agitation:

5 g—inorganic pigment (TiO$_2$, average particle size ≦1/um, product of Merck company, type 808)

5 g—encapsulating material, which was a wax (polyethylene wax of BASF company, type OA, m.p. 89° to 99° C., molecular weight <10,000)

0.5 g—surfactant, which was sorbitan tristearate ("SPAN 65" brand name product of Atlas Chemical company)

0.5 g—charge control agent, which was copper oleate (a product of Riedel-de Haen company).

The mixture is heated to 100° C. with continued agitation, and then cooled down to room temperature. The thermosolution point of the polyethylene wax in the solvent (as determined in a separate experiment) was 85° C. At this temperature, or just above it, the wax which up to this point has been solid dissolves rapidly in the solvent forming a clear, homogeneous phase. Clouding and precipitation of the wax from the clear solution occurs when the mixture is cooled below the thermosolution point.

In order for the pigment particles to become encapsulated with wax the thermosolution point must be passed, first from lower to higher temperatures and then from higher to lower temperatures, preferably under continued agitation the mixture.

The mixture when cooled down to room temperature was filtered, and the residue remaining on the filter, i.e. the wax-encapsulated pigment particles, were washed with cold hexane in order to remove adhering "ISOPAR" solvent. But it is generally not critical to remove all the solvent.

(C) 0.3 g of the wax-encapsulated pigment particles 9, 10 thus obtained was stirred into a mixture (dielectric liquid phase 8) consisting of 5 ml liquid paraffin ("perliquidum", DAB 6, density 0.83 to 0.87 g/cm$^3$, maximum viscosity about 65 cP) and 5 ml of 1, 1,2-trichlorotrifluoroethane (Fluka No. 91440, "GENETRON" or "FREON" brand 113) containing 30 mg of Oil Blue B as a contrasting dye. In order to produce the EPID suspension, the resulting mixture was homogenized for about 10 sec using ultrasound ("SONICATOR" instrument of Heat Systems-Ultrasonics, Inc.) and filled as the suspension 13 into an EPID cell (test cell in accordance with FIG. 1, both plates consisting of glass with transparent electrodes, one segmented, and a plate separation of 100/um).

(D) The suspension 13 exhibited excellent properties in the EPID cell:
  (a) The electrophoric particles 9, 10 were very highly and uniformly dispersed. A sharp maximum in the particle size distribution was found at a particle diameter of about 2/um.
  (b) The particles exhibited a well-defined negative charge; the optical contrast ratio was between 5:1 and 10:1. Charge definition was demonstrated by microscope observation of electrophoretic particle migration. In the field between the electrodes, all particles migrated with practically equal velocity as a front from one electrode to the opposite electrode when the polarity (25 V dc) was reversed. The operational or migration velocity was high, requiring between 0.1 and 0.2 sec for the electrophoretic migration of the particles from one electrode to the opposite electrode.

EXAMPLE 2

The operations were the same as in example 1, but with the difference that in addition to the 5 g of polyethylene wax, 2.5 g of high-melting paraffin (DAB 6, mp. 50° to 62° C.) was used as second encapsulating material.

The thermosolution temperature of this wax as determined in a preliminary exxperiment was at about 45° C. Upon cooling from 100° C. down toward room temperature, at first an inner layer 10 of polyethylene wax and then an outer layer 11 of high-melting paraffin is deposited on the pigment particles 9.

Suspension 13 produced in an otherwise identical manner displayed excellent properties similar and in part superior to those reported in example 1 when tested. Tests repeated one month later produced no indications of unfavorable changes.

EXAMPLE 3

The operations were the same as in example 2, but with the use of cobalt naphthenate (of "practical" quality, product No. 60 830 of Fluka company) instead of copper oleate as the charge control agent. Results practically as good as those reported in example 2 were obtained; the contrast ratio was 7:1.

EXAMPLE 4

Operations were the same as in example 2, but with the use of aluminum stearate (pure, product No. 26402 of Riedel-de Haen company) instead of copper oleate as the charge control agent. Results practically as good as those reported in example 2 were obtained, but the resulting particle charge was positive here, in contrast to previous examples.

EXAMPLE 5 (FOR COMPARISON)

The operations were the same as in example 4, but with the following changes:

The surfactant and the charge control agent were added, not in step (B) during encapsulation but in step (C), to the dielectric phase 8.

The suspension thus obtained was ill-suited for EPID cells, mainly because of the insufficiently high and insufficiently uniform degree of dispersion. Agglomerates of electrophoretic particles measuring up to 50-100/um were observed. The particle charge was also insufficiently well-defined, which resulted in a poor contrast ratio between display segments of opposite polarity; the ratio of the reflected light intensities was smaller than 2:1.

EXAMPLE 6 (FOR COMPARISON)

The operations were the same as in example 2, but with the omission of charge control agent in step (B).

Again, the suspension thus obtained was ill-suited for operation of an EPID cell, since the particle charge was poorly defined. During microscopic observation of electrophoretic particle migration between the plates, particle charge of both signs were detected, indicated by the migration of some particles 9, 10, 11 to one electrode (4), and other particles 9, 10, 11 to the other electrode (5). The motions of the particles were also erratic, as evidenced by changes in the direction of motion under constant field. The contrast ratio was lower than 2:1, and the suspension layer had a nonuniform, spotty appearance in the quiescent state.

The degree of dispersion of the particles was high and the degree of uniformity good with a sharp maximum of the particle size distribution at a particle diameter of about $2/\mu m$.

EXAMPLE 7 (FOR COMPARISON)

The operations were the same as in reference example 6, but with the modification that 50 mg of copper oleate as a charge control agent was added to the dielectric liquid 8 in step (C). The dispersion 13 thus obtained was ill-suited for the operation of EPID cells since the particles immediately adhered to the electrodes upon application of the electric field, and could not be moved away upon field reversal. This means that the particles did not have a stable charge, even though the degree of dispersion of the suspension was good (high and uniform).

This experiment shows that when the charge control agent is in the liquid dielectric medium rather than in the pigment particle coating it does not have any advantageous effect, even when the degree of dispersion of the encapsulated particles 9, 10, 11 is good.

Reference examples 5 to 7 show that the presence of the charge control agent during the encapsulation step is essential. Test results show that the charge control agents as used according to the present invention evidently dissolve in the encapsulation material, preferably wax, by forming a solid solution, and are not leached to any significant extent by the liquid dielectric medium 8 of suspension 13 in the EPID cell. The reference examples show further that a charge control agent which is contained in the liquid dielectric medium 8 rather than in the encapsulating layers 10 or 10, 11 evidently cannot accumulate to a sufficient extent on the encapsulating coatings to be effective. This finding is surprising in view of the good solubility of the charge control agents of the present examples in the preferred encapsulating materials. It is surprising, too, that waxes, such as the low-molecular-weight polyolefin waxes, offer significant advantages over the polyolefin resins such as polyethylene resins when they are used to embed inorganic or organic pigments.

It is obvious that the materials and operating conditions mentioned in the above examples 1 to 4 can be modified on the basis of present information. For example, instead of TiO$_2$, other known inorganic pigments and also known organic pigments can be used, since the advantages of a charge control agent built into the coating can also be realized. Previously the coating was only required for density compensation which up to this point was solely important for the inorganic pigments. A group of waxes preferred here, particularly polyolefin waxes, have a melt viscosity (at 120° C. or 140° C., respectively) of 100 to 7000, in particular of 100 to 3000 mm$^2$/sec.

The surfactant choice, too, can be modified. Apart from the mutual replacement of nonionic surfactants, it has been found that even a charge control agent such as copper oleate can function in part or alone as the surfactant as well.

Furthermore, the charge control agent of the mixture formed in step (B) of example 1 can be added after heating (after thermosolution of the encapsulating material) but before cooling below the thermosolution temperature. Instead of a single charge control agent and single surfactant, mixtures of such materials can also be used, and both the organic liquids used as working medium and in the suspension 13 can be modified. It is generally preferred that the surfactants and, in particular, the charge control agents dissolve in the thermosolved encapsulating material and remain molecularly dispersed in it as a solid solution even after solidification.

For a quantitative estimate of the main parameters, i.e. the electrophoretic mobility or velocity and the charge of electrophoretic particles 9, 10 or 9, 10, 11, the following equation (I) can be used:

$$u_{ep} = \frac{\zeta \epsilon}{6\pi\eta} = \frac{Q}{6\pi\eta r} \quad (I)$$

where
$u_{ep}$ = the electrophoretic mobility, typically $10^{-5}$ cm$^2$ sec$^{-1}$V$^{-1}$,
$\zeta$ = the zeta potential of the pigment particles, typically ±100 mV,
$\epsilon$ = dielectric constant of the suspending medium, typically 2.3,
Q = charge of the individual particle, typically ±100 e$^-$,
r = particle radius, typically 1/µm,
$\eta$ = viscosity of the medium, typically 1 cP.

Also useful for an approximate definition is the equation (II)

$$v_{ep} = u_{ep} \cdot E \quad (II)$$

where
$v_{ep}$ = the electrophoretic migration velocity,
E = the electric field strength.

As an example for the value of $v_{ep}$ the following rough relation can be used:
$v_{ep}$ with 3000 V/cm = 30 V/cell spacing will amount to 300/µm sec$^{-1}$ or 0.3 sec/cell spacing.

Further possibilities of modification of the invention with respect to design, fabrication, operation, and application of EPID cells are within the capabilities of those familiar with the state of the art.

What is claimed as new and desired to be secured by letters patent of the United States is:

1. An electrophoretic display comprising:
   a cell having two opposed plates spaced relative to each other and at least regionally provided with electrodes of which at least the plate facing an observer and its electrode are transparent,
   said cell containing a suspension consisting of an inert continuous dielectric liquid phase and a dispersed solid phase constituted at least in part by optically discriminable electrophoretic particles, said individual electrophoretic particles all having practically the same density as the liquid phase, and at least part of the electrophoretic particles constituted by pigment particles coated with a sheath of organic material solidified at the cell operating temperature but melting at higher temperatures,
   wherein the sheath matrial contains at least one charge control agent so as to impart a well-defined and practically uniform surface charge as well as a well-defined and practically uniform surface potential to the electrophoretic particles.

2. A display as claimed in claim 1 wherein the charge control agent comprises:
   a compound selected from the group consisting of a salt and a complex compound of an at least divalent metal and an organic acid.

3. A display as claimed in claims 1 or 2 where the charge control agent is contained in the coating material at least partly in the form of a solid solution.

4. A display as claimed in claim 2 where the organic acid contains at least 5 C-atoms.

5. A display as claimed in claim 4 where the organic acid is a carboxylic acid.

6. A display as claimed in claim 5 where the carboxylic acid is a monobasic acid with at least 8 C-atoms.

7. A display as claimed in claim 6 where the organic acid is an alkanoic or alkenoic acid.

8. A display as claimed in claim 7 where the organic acid is a high fatty acid.

9. A display as claimed in claim 5 where the organic acid is an alicyclic carboxylic acid.

10. A display as claimed in claim 2 where the at least divalent metal is selected from groups IIA, IIIA, or the iron metal group, or where it is Cu(II).

11. A display as claimed in claims 1 or 2 where the organic coating material is a material soluble in the range between 50° and 150° C. in practically nonpolar aprotic solvents.

12. A display as claimed in claims 1 or 2 where the coating material at least in part consists of a wax.

13. A display according to claim 5, wherein the organic acid is a monocarboxylic acid.

14. A display according to claim 5, wherein said carboxylic acid is a monobasic acid with at least 12 C-atoms.

15. A display according to claim 7 wherein said organic acid is a high fatty acid selected from the group consisting of a stearic acid or oleic acid.

16. A display according to claim 9 wherein said alicyclic acid consists of naphtheic acid.

17. A display according to claim 12 wherein said wax comprises:
   a paraffinic wax which melts at a temperature in the range between 50° and 200° C.

18. A display according to claim 17 wherein said paraffinic wax has a melting temperature in the range between 50° and 100° C.

* * * * *